United States Patent [19]

Davis

[11] Patent Number: 4,495,862

[45] Date of Patent: Jan. 29, 1985

[54] LIMB BUNDLER AND BAG HOLDER

[76] Inventor: Douglas A. Davis, 6664 Royer Ave., Canoga Park, Calif. 91307

[21] Appl. No.: 533,289

[22] Filed: Sep. 19, 1983

[51] Int. Cl.³ .............................................. B65B 13/00
[52] U.S. Cl. ...................................... 100/34; 211/132; 248/98
[58] Field of Search ................... 100/1, 2, 34; 248/95, 248/97, 98, 99; 280/641, 651; 211/132

[56] References Cited

U.S. PATENT DOCUMENTS

| | | | |
|---|---|---|---|
| 385,126 | 6/1888 | Leupold | 100/34 |
| 566,333 | 8/1896 | May | 100/34 |
| 639,292 | 12/1899 | Rippon | 248/97 |
| 2,652,930 | 9/1953 | Christenson | 100/34 X |
| 3,633,932 | 1/1972 | Holden | 280/641 |
| 3,739,714 | 6/1973 | Howard | 100/34 |
| 3,893,648 | 7/1975 | Gilbert | 248/97 |
| 4,318,520 | 3/1982 | Walker | 248/99 X |

Primary Examiner—Billy J. Wilhite
Attorney, Agent, or Firm—Lowell G. Turner

[57] ABSTRACT

This limb bundler and trash bag holder comprises a foldable frame 10 having two pairs of sub-frame members 12 and 14, preferably identical, each such member having a lower leg portion 20, 20a, 30 or 30a, and an upper leg portion 22, 22a, 32 or 32a, and intermediate portions 24, 24a, 34 or 34a. Each of the sub-frame members 12 and 14 is pivotally hinged to the other for joint movement and pivotal foldability. Swiveling wheels 36–39 are affixed at the bottom of each leg portion 20, 20a, 30 and 30a and cap-like end protectors 40–43 are provided upon the extremities of the respective legs.

A pair of foldable brace members 48 and 48a are attached to the sub-frame members 12 and 14 for restraint against excessive frame member distortion and to accommodate folding.

A secondary brace and trash bag support 56 is connected between the first-mentioned brace members 48 and 48a. A twine holder and dispenser 64 is mounted to the brace 56 and a twine cutter 98 is attached to one of the frame members. A trash bag holder 100 and a glove holder 104 are also sometimes provided for purposes of convenience.

13 Claims, 14 Drawing Figures

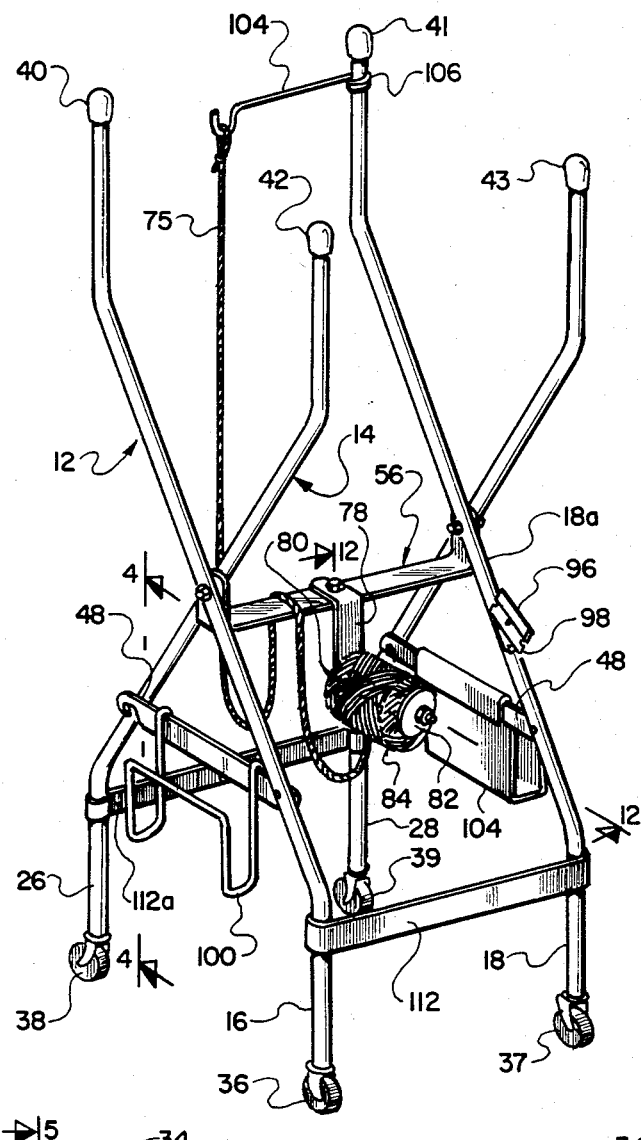
Fig.3.
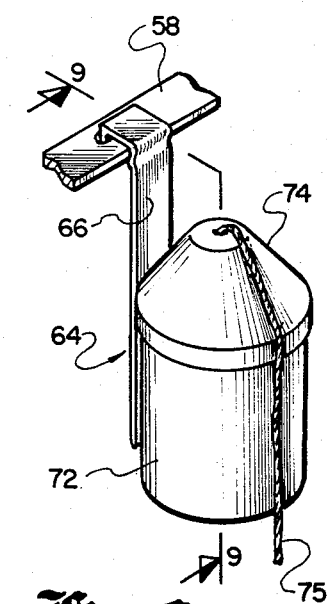
Fig.7.
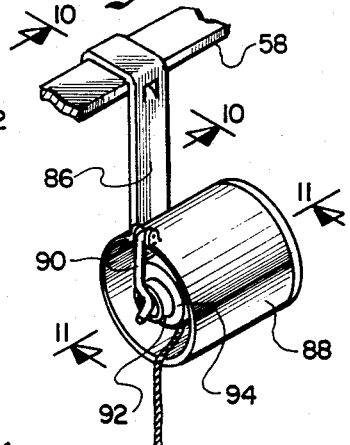
Fig.8.
Fig.4. Fig.5. Fig.6.

LIMB BUNDLER AND BAG HOLDER

TECHNICAL FIELD

This invention finds its primary use in and around the home and lot for dual use in bundling, collecting and rapidly bundling tree and bush limbs and the like and for supporting trash bags during filling procedures. Hence, its general use is for efficient trash collection and disposal purposes.

BACKGROUND ART

A novelty search has revealed the existence of several patents having at least some remote similarity to the present invention. Each of these will be discussed in relation to its apparent pertinence to this invention.

U.S. Pat. No. 3,633,932 is directed to a "Bag Carrier With Closable Top." It incorporates two U-shaped frame members 16 and 18 of different widths and variously interconnected by permanent structures not only at their pivotal points, but at top and bottom as well. A flexible bag is intended to be disposed over the bite portions 56 and 58 interconnecting the legs and to rest upon the platform 38, which is of an extremely complex and costly structure for a device of this character. It includes two, differently sized and constructed portions attached to the frame legs and centrally pivoted for upward foldability. In general, that device, while intended for a flexible bag, as is the present invention, is more structurally complicated and costly than a device of this character should be. The frame members are also of solid bar materials, making it heavier and more susceptible to bending than the present invention, which utilizes tubular members.

The Portable Hamper of U.S. Pat. No. 4,354,543, similar to the above-described device, is intended and constructed for use as a clothes hamper in hospitals and nursing homes. Very similar in concept and structural makeup to the Bag Carrier of U.S. Pat. No. 3,633,932, the two "rectangular sub-frames" 20 and 22 are differently constructed as to both size and details of shape. Again, a lower tray 14 is included for supporting the clothesbag 18 and a cover 16 is required to be pivotally attached to the top. This combination results in a unit for a different purpose, more complex and more expensive than is the present invention, as well as not having utility for the limb bundling purpose, a primary feature of my invention.

Other patents, not nearly so pertinent as those discussed above, are identified for informational purposes. A "Device for Holding and Bundling Newspapers" is described in U.S. Pat. No. 3,739,714. U.S. Pat. No. 385,126 is directed to a Fodder Binder and U.S. Pat. No. 566,333 describes a Corn Fodder Binder.

None of the foregoing art is comprehensive in providing the beneficial teachings of the present invention.

DISCLOSURE OF INVENTION

The invention generally comprises a pair of substantially identical sub-frame members made up from identical legs having upper and lower end portions in parallel planes and joined by intermediate, relatively angled portions, the legs being fixed together in spaced relation with a strap member. The intermediate portions of the sub-frames are pivotally connected for compact folding for storage and securably retainable in their unfolded position by a latching means. The upper leg portions are separated for receiving limbs and bags therebetween and means are provided for retaining and cutting bundling twine and for the storage of trash bags, gloves and the like.

A principle objective of this invention is to provide an economically constructed utilitarian receptacle for both bundling limbs and retaining trash bags.

Another objective is to provide a foldable frame, light of weight, readily movable and highly useful in maintaining neatness and order around the home and yard.

Other objects of invention will become apparent upon examination of the specification and drawings and in view of the appended claims.

BRIEF DESCRIPTION OF DRAWINGS

FIG. 3 is a perspective view of the invention illustrating certain additional features relating to limb bundling;

FIG. 4 is a fragmentary elevational view, taken along line 4—4 of FIG. 3, showing a latch member;

FIG. 5 is a fragmentary elevational view the latch member of FIG. 4, taken along line 5—5 of FIG. 4;

FIG. 6 is a view of an alternative embodiment of the latch member of FIG. 5, taken from the same position;

FIG. 7 is a perspective view of an alternative embodiment of a twine dispenser;

FIG. 8 is a perspective view of another embodiment of a twine dispenser;

BEST MODE FOR CARRYING OUT THE INVENTION

Figures 1, 2:
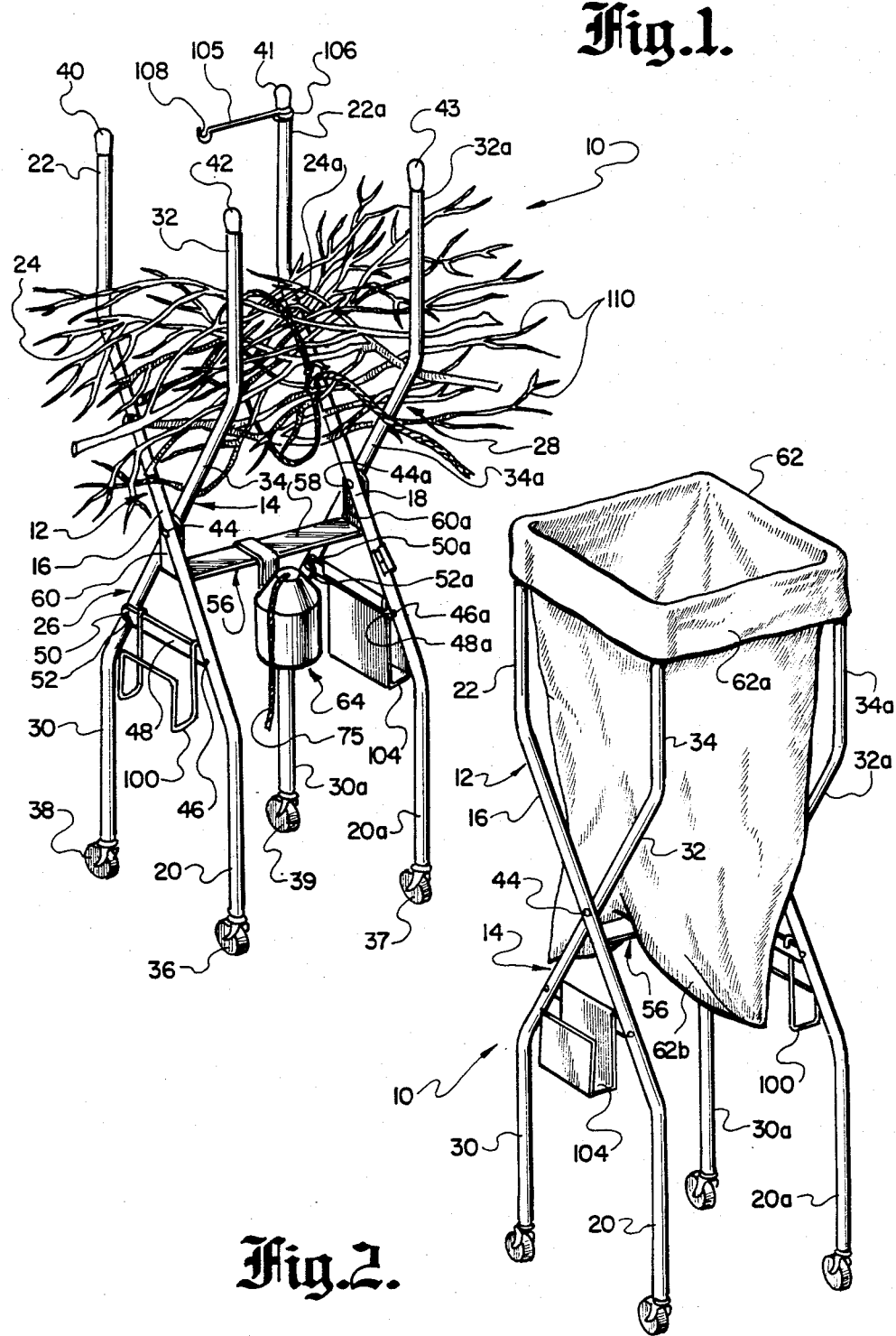
FIG. 1 is a perspective view of the invention, shown with limbs bundled therein.
FIG. 2 is a perspective view of the invention supporting a trash bag.

The invention, in a basic configuration, is illustrated in FIGS. 1 and 2. Similar parts are therein identified by the same nomenclature numbers.

The limb bundler and trash bag holder or total frame of this invention is indicated generally by the numeral 10.

The frame 10 is made up of a pair of sub-frames 12 and 14. Each sub-frame 12 and 14 comprises a pair of legs, preferably as nearly identical to one another as possible, so as to minimize the cost of manufacture and simplify assembly. The sub-frame 12 includes identical legs 16 and 18. The respective legs are configured with a lower portion 20 or 20a and an upper portion 22 or 22a in planes substantially parallel to one another. These two respective portions are integrally joined by intermediate portions 24 and 24a angled between them.

The sub-frame 14 similarly includes a pair of identical basic leg members 26 and 28. These leg members respectively comprise lower portions 30 and 30a, upper portions 32 and 32a and integrally joining intermediate portions 34 and 34a.

Each of the lower leg portions 20, 20a, 30 and 30a is preferably supplied with a standard caster 36, 37, 38 or 39, respectively, of suitable design, usually fairly large to provide maximum stability and which will roll readily over rough terraine. However, it is sometimes preferable to eliminate the casters, making the unit more economical.

Each such leg is also provided at its upper extremity with a standard cover or tip member 40, 41, 42 or 43, respectively. These covers are made of a smooth, tough, impact resistant material selected from any one of a variety of plastics or similar materials. They also define blunting end members resistant to the penetration of flexible trash bags and the like placed thereover. Similar members are also applied to the lower leg portions when the casters are removed.

Approximately centrally of the leg intermediate portions 24 and 24a these portions are pivotably attached to similar regions in the intermediate portions 34 and 34a by suitable pivot pins 44 and 44a. This provides a means whereby the sub-frame assemblies 26 and 28 may be folded into a compact package.

Pivotally attached to each of the intermediate leg portions 24 and 24a, by pivot pins 46 and 46a, are a pair of brace members 48 and 48a. It will be noted that the brace 48 is positioned on the internal side of the leg portion 24 and that the brace 48a is on the outside of the leg portion 24a. This construction accommodates the continued use of identical components, as will be later described.

Affixed through the intermediate leg portions 34 and 34a are a pair of brace retention pins 50 and 50a which are flush with one side of the legs, but extend outward beyond the leg surfaces on the opposite sides of the legs, essentially as illustrated in FIG. 4. They are also positioned substantially horizontal with respect to the pivot pins 46 and 46a when the frame 10 is in use on a horizontal surface. Thus, the braces 48 and 48a, which are respectively provided with canted slots 52 and 52a in their ends opposite the pivot pins 46 and 46a, as best illustrated in FIG. 5, or which may be alternatively provided with keyhole slots 54 and 54a, such as best illustrated in FIG. 6, may be quickly and easily latched or unlatched in relation to the retainer pins 50 or 50a. The braces 48 and 48a are shown in their latched positions in each of FIGS. 1, 2 and 3.

Centrally of the frame 10 and mounted in a pivotal relationship upon the pivot pins 44 and 44a is a generally U-shaped connecting bar 56 having a central portion 58 and a pair of upstanding ends 60 and 60a, perforated to accept the pivot pins 44 and 44a therethrough. It is preferable, although not mandatory, that the connecting bar 56 be flat, so as to best support a flexible bag, such as the trash bag 62 illustrated in FIG. 2, for example. Therein the bag 62 has its upper end disposed over the four leg tips 40-43, with a skirt portion 62a extending downward. The bottom 62b of the bag rests upon the connecting bar 56, such that at least a portion of its weight is supported by that bar and relieved from the leg tips. This reduces the possibility of bag penetration by the leg tips and permits the use of lighter weight bags than would otherwise be practical.

Figure 9:
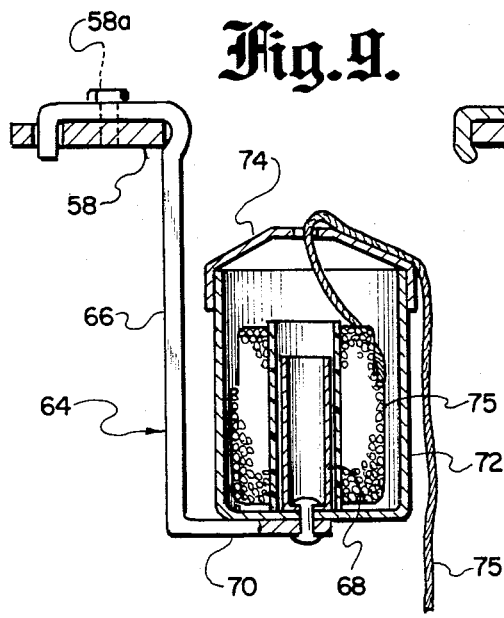
FIG. 9 is a sectional view taken along line 9—9 of FIG. 7.

Attached to the basic frame 10 in some practical location is a twine dispenser means for the retention and dispensing of twine used to tie limbs, twigs and the like collected between the sub-frames 12 and 14. It has been found to be generally preferable to attach such a twine dispenser conveniently to the connecting bar 56. Hence, as illustrated in FIGS. 1, 7 and 9 a twine dispenser 64 comprises a conveniently shaped support bracket 66 conventionally hung from the connecting bar central portion 58 (FIG. 9) and having an upstanding spindle 68 riveted or otherwise affixed to an opposite end 70 of the bracket. Similarly affixed in a position surrounding the spindle 68 is a twine-accepting canister 72 having a tapered and centrally perforated lid 74 through which twine 75 may be dispensed from a twine roll 76 upon the spindle 68 and within the canister 72.

It is sometimes desirable to reverse the end 70, as shown at 70a, such that the twine roll 76 is essentially under the bar 58. In such case it is also sometimes desirable to provide a hole 58a through the bar 58 and the end of the bracket 66 for feeding the twine 75 through. The cannister 72 is sometimes removed for the sake of economy.

Alternative embodiments of the twine retainer and dispenser are shown in FIGS. 3, 8 and 10–12.

Briefly described, a bracket 78 (FIGS. 3 and 12) supports a horizontal spindle 80 having an enlarged end 82, provided by a butterfly nut-retained washer, for example, upon which a twine roll 84 is supported to rollingly dispense the twine.

Figure 10:
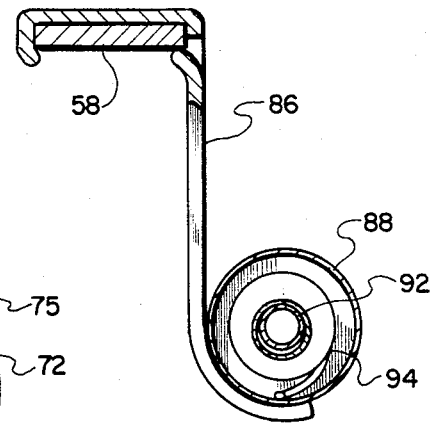
FIG. 10 is an end view of the dispenser of FIG. 8, taken along line 10—10.
Figure 11:
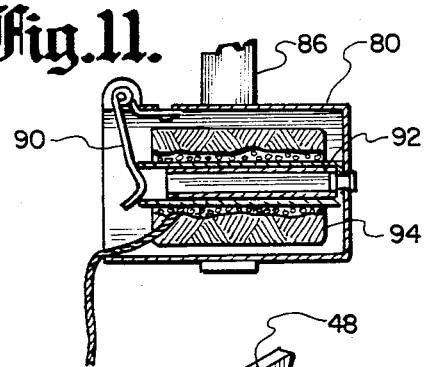
FIG. 11 is an elevational sectional view of the twine dispenser of FIG. 8, taken along line 11—11.
Figure 12:
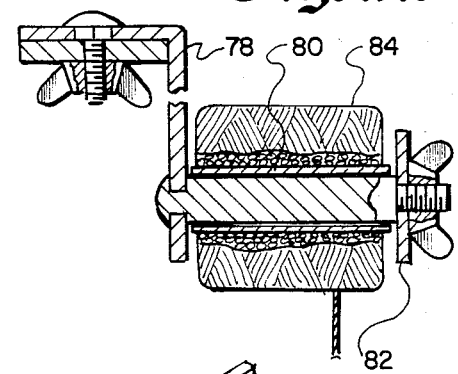
FIG. 12 is an elevational sectional view of the twine dispenser of FIG. 3, taken along line 12—12.
Figure 13:
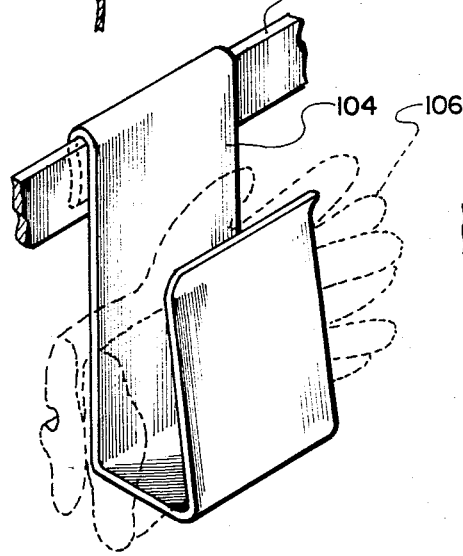
FIG. 13 is a perspective view of the glove holder of this invention.

In FIGS. 8, 10 and 11 a bracket 86 supports a horizontally disposed canister 88 with a spring 90 co-axially positioning a spindle 92 within the canister. A twine roll 94 is positioned upon the spindle 92 for twine dispensing. As noted with respect to FIG. 9, it will be recognized that the lower extremity of the bracket 86 may be reversed to place the twine roll 94 under the bar 58, parallel thereto, placing it out of the way of a trash bag when such a bag is used.

Concerning the brackets 66, 78 and 86, various support means are illustrated for their removable retention upon the connecting bar central portion 58, since it is sometimes desirable that it be removed therefrom, or sold without it, particularly in situations wherein it is intended that the primary function of the invention will be as a flexible bag holder.

A twine cutter is attached to one of the frame legs, as best illustrated in FIG. 3, but also seen in FIGS. 1 and 2. Therein a bracket 96 for holding a single-edged razor blade 98 is bolted, riveted or otherwise affixed to the leg 18a adjacent the twine roll 84. The twine may, thus, be readily severed by simply drawing it over the edge of the razor blade at whatever length the user desires.

Figure 14:
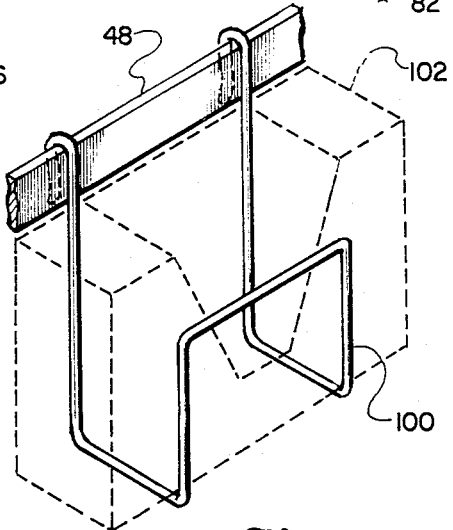
FIG. 14 is a perspective view of the trash bag holder of this invention.

A trash bag box retainer 100 for conveniently and snugly holding a box of trash bags 102 in a bag-dispensing orientation is usually provided. In this instance the retainer 100 is fabricated from a stiff wire properly configured to be hung from one of the braces 48. It is best illustrated in FIG. 14.

Similarly, a retainer 104 for gloves 106 or the like is preferably made from sheet metal, bent into a proper supportable and glove-retention configuration.

It will be understood that the trash bag box and glove retainers are illustrated and described representatively only. They may be interchanged or differently configured without departing from the teachings of this invention.

It has also been found to be most convenient for limb bundling purposes to provide a twine-end retention means in a position from which it can be quickly grasped for tying purposes. Such a means is shown in FIGS. 1 and 3. There a twine-end retainer 105 is provided in the form of a relatively stiff wire, wrapped around or otherwise retained, as at 106, upon or near the upper extremity of the leg upper portion 22a. It extends outward and generally toward the opposite upper leg portion 22. A hook portion 108 is provided at the opposite end to receive and retain a properly looped end of the twine 75 until its use is required.

The frame 10 of FIGS. 1-3 is utilized for limb bundling by first looping the end of the twine 75 and hanging the loop over the hook 108 on the twine-end retainer 105 (FIG. 3). The limbs 110 are cut into desirable lengths (usually about 3-5 feet) and placed across the frame 10 between upper leg portions of the respective sub-frames 12 and 14, permitting the limbs to nestle down into the open region therebetween as far as possible. As additional limbs are added they are crushed more tightly together until they are forced into a relatively dense and compact grouping. The twine end, which still hangs from the twine retainer hook, is then retrieved by simply reaching over the limb bundle, from the opposite side, and drawing the twine across and around the limbs to a convenient length. The twine is then severed at the length determined by drawing it across the edge of the razor blade 98. The two loose ends of the twine are then drawn tightly around the limbs, usually with the cut end being inserted through the looped end (FIG. 1), securely bundling them, and the ends are tied. It will be apparent that multiple passes of the twine about the limbs can be made if this is desirable in the upper section.

It will be noted that in the embodiment illustrated in FIG. 1 the upper and lower portions of the legs are of approximately the same lengths, such that the entire frame stands up to a height convenient for the user to work with. It will be apparent that these legs, as to any portion of them, may be of differing lengths, so long as the mating portions are the same. This will provide flexibility, so that the lengths can be most suitably configured for the particular user or the particular job for which the unit is being used. For example, it will sometimes be desirable that the upper regions be longer in order to accommodate a larger bundle of limbs than would otherwise be possible. It will be seen that in FIG. 3 the intermediate portions of the legs are considerably longer vis-a-vis the upper and lower leg portions than in the FIG. 1 embodiment, thereby providing enhanced stability and a greater limb or trash bag capacity.

It will also be noted that the FIG. 3 embodiment is provided with a pair of sub-frame cross braces 112 and 112a connecting the lower leg portion 20 to the portion 20a and the lower leg portion 30 to the portion 30a. These braces impart greater strength to the sub-frame structures and improved stability to the entire structure of the frame 12. They also enhance foldability of one sub-frame relative to the other, since the interconnected legs are required to move as an integral unit, rather than being permitted to move independently.

It will be apparent that the invention has been illustrated and described in somewhat general terms and that reasonable variations in structural arrangements can be made without departing from either the spirit or scope of the invention.

I claim:

1. A trash bundler and collector comprising:
a frame member further comprising:
   a pair of leg assemblies, each including a pair of legs, each said leg having a top and a bottom end;
   structural means interconnecting said bottom ends of each said pair of legs;
   pivot means intermediate said ends and interconnecting said legs in each said leg assembly with said legs in the other said leg assembly, fixing the relative positions of said leg assemblies and facilitating relative pivotal movement therebetween; and
   latch means for interconnecting and further securing said pair of legs in each said assembly against movement relative to the other said pair of legs.

2. A limb bundler and flexible bag holder comprising:
a frame having upper and lower portions interconnected in swivelling relationship to one another in scissor-like fashion to open and closed positions;
said lower portion having four leg portions for contacting a support surface;
said upper portion having four leg portions, each of said leg portions having a section in mutual parallelism with the other said sections and separated, when said frame portions are open, to receive and retain limbs, twigs, flexible bags and the like therebetween;
means fixed to and interconnecting said leg portions of said lower portions to cause said last-mentioned leg portions to move as an integral unit and enhance foldability of the limb bundler and flexible bag holder; and
retention means latchable to interconnect said leg portions of said lower portions for rigidizing in both directions the relative positions of said frame portions.

3. A limb bundler and trash bag holder comprising:
a pair of frame members, each being substantially the mirror image of the other and each further comprising;
   a pair of interconnected, spaced legs, each having a lower portion and an upper portion in substantially mutual parallelism and structurally joined by an intermediate portion angled therebetween;
   said intermediate portion of each said leg in one said frame member pivotally connected to said intermediate portion in one of said legs in the other of said pair of frame members; and
   brace means attached between said pair of frame members and structurally stabilizing those frame members relative to one another;
   whereby a limb-receiving region is defined between said frame members above said pivotal connection and a trash bag may be disposed over and retained by said legs.

4. The invention of claim 3 wherein said brace means is at least one stiff, double ended strap member pivotally connected at one end thereof to at least one of said legs upon one of said frame members and extends to at least one of said legs upon the other of said frame members, and said last-mentioned at least one of said legs includes a retention member for receiving and retaining an opposite end of said at least one stiff strap member and fix the position of one of said frame member with respect to the other.

5. The tree limb bundler and trash bag holder of claim 4, wherein
said brace means includes an angled slot in one end thereof to receive said retention member.

6. The tree limb bundler and trash bag holder of claim 4, wherein
said brace means includes a keyhold slot in one end thereof to receive said retention member.

7. The tree limb bundler and trash bag holder of claim 4 wherein at least one bracket is provided, attachable to said brace means, for receiving trash bag boxes, gloves and the like.

8. A tree limb bundler and trash bag holder comprising:

a first and a second pair of legs, each said leg having a first end for ground support, an intermediate region disposed at an angle from said first end, and a second end disposed at an angle from said intermediate region and substantially parallel to said first end;

the respective legs of each said pair being affixed to one another in a spaced, substantially parallel relationship;

each said leg of each said leg pair being fixed to a leg in the other said pair in a mutually swiveling relation at juncture positions intermediate of said intermediate regions; and support means attached to said leg pairs and extending therebetween at said juncture positions for structural support and for trash bag support.

9. The tree limb bundler and trash bag holder of claim 8, further including:

twine holder and dispenser means attached to said bundler and holder, twine end holding means attached to a second end of one of said legs, and a twine cutter affixed to said bundler and holder.

10. The tree limb bundler and trash bag holder of claim 9 wherein said twine holder and dispenser means is a bracket attached to said support means and has a twine-receiving spindle affixed thereto.

11. The tree limb bundler and trash bag holder of claim 10 wherein said twine-receiving spindle is positioned beneath said support means, and said support means includes twine guide means therethrough.

12. The tree limb bundler and trash bag holder of claim 10 wherein said twine-receiving spindle extends vertically upward and is enclosed by a canister having a perforated lid through which twine may be threaded.

13. The tree limb bundler and trash bag holder of claim 10 wherein said twine-receiving spindle is horizontally oriented, is surrounded by a protective canister, and includes spring retention means attached to said canister for holding a twine spool upon said spindle.

* * * * *